(12) United States Patent
Minamitani et al.

(10) Patent No.: US 7,325,440 B2
(45) Date of Patent: Feb. 5, 2008

(54) HOLE INSPECTION SYSTEM FOR A PIERCED CONTAINER

(75) Inventors: Kozo Minamitani, Mino (JP); Hitoshi Okino, Kobe (JP)

(73) Assignee: Santen Pharmaceutical Co., Ltd., Osaka (JP)

( * ) Notice: Subject to any disclaimer, the term of this patent is extended or adjusted under 35 U.S.C. 154(b) by 0 days.

(21) Appl. No.: 10/564,863

(22) PCT Filed: Jul. 16, 2004

(86) PCT No.: PCT/JP2004/010179

§ 371 (c)(1),
(2), (4) Date: Jan. 17, 2006

(87) PCT Pub. No.: WO2005/008176

PCT Pub. Date: Jan. 27, 2005

(65) Prior Publication Data

US 2006/0191322 A1   Aug. 31, 2006

(30) Foreign Application Priority Data

Jul. 17, 2003  (JP) .............................. 2003-276014

(51) Int. Cl.
*G01M 3/02* (2006.01)
*G01B 13/10* (2006.01)
(52) U.S. Cl. .......................... 73/37.9; 73/37.5; 73/1.36
(58) Field of Classification Search ................. 73/37.9, 73/1.36, 41, 49.4, 49.2, 37.5
See application file for complete search history.

(56) References Cited

U.S. PATENT DOCUMENTS 715,324 A * 12/1902 Wachhorst et al. .......... 73/49.2
3,431,773 A * 3/1969 Calhoun ...................... 73/49.2
3,863,492 A   2/1975 Trask, II
5,042,291 A   8/1991 Lehmann
5,333,492 A   8/1994 Aarts

FOREIGN PATENT DOCUMENTS

| EP | 0 379 986 | | 8/1990 |
| EP | 1 230 905 | | 8/2002 |
| JP | 4-116439 | * | 4/1992 |
| JP | 7072033 | | 3/1995 |
| JP | 08 178640 | | 12/1996 |
| JP | 9122208 | | 5/1997 |
| JP | 2004-69325 A | * | 3/2004 |

* cited by examiner

Primary Examiner—Michael Cygan
(74) Attorney, Agent, or Firm—The Webb Law Firm

(57) ABSTRACT

A hole inspection system for a pierced container 1 for inspecting an outwardly opened hole 1a formed in a flexible container 1 for performing a proper inspection for the size of the hole 1a of the flexible pierced container 1. The flexible container 1 is pressed from outside to blow out the gas A present within the container through the hole 1a thereby to detect a jet pressure of the gas blown out through the hole 1a by the pressing operation and to determine the size of the hole 1a by comparing a detected value of the jet pressure in a predefined period while the jet pressure is rising with an upper limit pressure value corresponding to a maximum size of the hole 1a and a lower limit pressure value corresponding to a minimum size of the hole 1a.

9 Claims, 2 Drawing Sheets

HOLE INSPECTION SYSTEM FOR A PIERCED CONTAINER

TECHNICAL FIELD

The present invention relates to a hole inspection system for a pierced container for inspecting an outwardly opened hole formed in a flexible container.

BACKGROUND ART

The above-noted hole inspection system for the pierced container is utilized, for example, for inspecting whether or not an installation hole formed in an eyedropper made of resin has an appropriate size. More particularly, the eyedropper, in use, is pressed by the thumb and fingers from outside to discharge a medical fluid contained within the container from the installation hole. At this time, if the size of the installation hole is too large, there is a chance that the medical fluid may be discharged more than the volume which is required. On the contrary, if the size of the installation hole is too small, a great force is required to discharge the medical fluid, which would take time for discharging the fluid. Thus, it is required that the installation hole should be formed to have an appropriate size in order to avoid such disadvantages.

Techniques that have been made public as related art of the hole inspection system according to the present invention will be described next, though they are not intended for inspecting the size of an installation hole of a container. They are a technique of inspecting leakage by pressing a capped container as sealed by a sealing member at peripheries of an opening to detect an air pressure leaking from the opening (see Patent Document 1), and a technique of inspecting, in a process of manufacturing a nipple of a feeding bottle, whether or not a sucking hole of the nipple is appropriately formed, based on an air flow amount, which is carried out by supplying compressed air to an interior of the nipple after the sucking hole of the nipple is opened and then measuring the amount of air discharged from the sucking hole (see Patent Document 2).

Patent Document 1: Patent Publication No. 7-72033
Patent Document 2: Patent Publication No. 9-122208

DISCLOSURE OF THE INVENTION

Problem to be Solved by the Invention

The above-noted prior art is not capable of inspecting the hole size of the flexible pierced container. If a maximum value of the pressure of a gas blown out through the hole is obtained as well, it may be possible to inspect the hole size based on the value. However, in this case, the pressure value changes over time, which could hinder an appropriate inspection of the hole size.

The present invention has been made having regard to the above-noted problem, and its object is to provide a hole inspection system for inspecting a pierced container, in which an appropriate inspection for the hole size of the flexible pierced container can be performed with a simple construction.

Means for Solving the Problem

A first characteristic feature to achieve the above object of the hole inspection system for the pierced container according to the present invention lies in that the flexible container is pressed from outside to blow out a gas present within the container through the hole thereby to detect a jet pressure of the gas blown out through the hole by the pressing operation and to determine the size of the hole by comparing a detected value of the jet pressure in a predefined period while the jet pressure is rising with an upper limit pressure value corresponding to a maximum size of the hole and a lower limit pressure value corresponding to a minimum size of the hole.

That is, the jet pressure of the gas blown out through the hole is detected while the flexible container having the outwardly opened hole formed therein is pressed from outside to blow out the contained gas through the hole, and the size of the hole was determined based on a comparison of the detected value of the jet pressure in the predefined period while the jet pressure is rising, with the upper limit pressure value corresponding to the maximum size of the hole and the lower limit pressure value corresponding to the minimum size of the hole.

As described above, in the hole inspection system for the pierced container according to the present invention, it is possible to enhance a reliability of the determination of the hole size by setting the predefined period noted above to the period while the jet pressure of the gas blown out through the hole is rising, namely the period during which a difference is distinctly recognized between the upper limit pressure value corresponding the permissible maximum size of the hole and the lower limit pressure value corresponding the minimum size of the hole.

Further, since the contained gas is blown out by pressing the container per se, the system can dispense with any device for injecting compressed air into the container from outside for the inspection, which can simplify the inspecting construction as well.

Hence, the present invention provides the hole inspection system for the pierced container which is capable of performing a proper inspection for the hole size of the flexible pierced container with a simple construction.

A second characteristic feature of the system according to the present invention lies in that, in addition to the first characteristic feature, a pressure chamber is formed by a member making tight contact with container outer peripheries around the hole communicating with the hole, thereby to detect a pressure within the pressure chamber as the jet pressure of the gas.

More particularly, when the gas contained in the container is blown out through the hole, the jet gas is retained in the pressure chamber communicating with the hole. Thus, the pressure within the pressure chamber is raised while the pressure of the jet gas is restrained from lowering. The increased pressure in the pressure chamber is detected as the jet pressure of the gas.

Therefore, whether or not the hole is appropriate is determined based on the pressure value of the jet gas whose pressure is restrained from sharp lowering by the pressure chamber. Thus, the present invention provides an effective mode of the hole inspection system for the pierced container, which allows a proper hole inspection even under the conditions where the pressure of the jet gas is extremely small.

A third characteristic feature of the system according to the present invention lies in that, in addition to the first and second characteristic features noted above, the pressing operation is executed with a medical fluid being present within the container.

More particularly, when the pierced container is intended to use by pressing the container to discharge the medical fluid contained in the container through the hole, the size of the hole is properly inspected under the condition similar to the condition for use of the container. Also, it is possible to perform the hole inspection with the container held in the same state, after a preceding process is executed to form the hole in an upper portion of the container or the like with the medical fluid being present within the container. This is suitable for the hole inspection in an assembly line of the pierced containers containing the medical fluid. Further, a pressing force is transmitted with certainty to the gas by the medical fluid contained in the container even when a certain distance exists between the pressed portion of the container and the hole. As a result, it is possible to reduce the influences of a contraction of the gas caused by the pressing operation or an expansion of the gas occurring with temperature variations, which can prevent misjudgments.

Therefore, the present invention provides another effective mode of the hole inspection system for the pierced container such as an eyedropper containing an eyedrop medicine.

A fourth characteristic feature of the system according to the present invention lies in that a reference pressure of a pressure detecting device for detecting the jet pressure is reset before executing the pressing operation.

More particularly, the reference pressure is reset (set to zero) whenever the: jet pressure is detected. Thus, even if atmospheric pressure is varied within an area including the assembly line of the pierced containers or the inspection line for the pierced containers, the jet pressure can be measured with accuracy and free from the influence of variations in atmospheric pressure. When the pressure chamber communicating with the hole is formed by the tight-contact member or the like and the pressure within the pressure chamber is detected as the jet pressure of the gas, the reference pressure may be reset after the pressure chamber is formed and before the pressing operation is executed.

BEST MODE FOR CARRYING OUT THE INVENTION

An embodiment of a hole inspection system for a pierced container according to the present invention will be described hereinafter with reference to the drawings, taking an example of being applied to a hole inspection of an instillation hole of an eyedropper made of resin.

In the hole inspection system for the pierced container according to the present invention, as shown in FIG. 1, while a flexible container 1 defining an outwardly opened hole la (corresponding to the instillation hole) is pressed from outside to blow out a gas A contained in the container through the hole 1a, a jet pressure of the gas A is detected by a pressure sensor 4. The detected value of the jet pressure is compared with an upper limit pressure value corresponding to a maximum size of the hole 1a and a lower limit pressure value corresponding to a minimum size of the hole 1a in a predefined period while the jet pressure of the gas A is on the increase, and thereby to determine the size of the hole 1a. A specific explanation will be provided below.

FIG. 1 is a schematic view of an inspection unit used for the hole inspection system for the pierced container according to the present invention. The eyedropper 1 which is vertically elongated is placed in vertical posture on an inspection table 7. More particularly, a medical fluid L is present in a lower portion within the container, air A is present in an upper portion within the container, and the hole 1a is positioned at a top portion of the container. Incidentally, an area including an assembly line of the pierced container in which the inspection unit is installed, or a hole inspection line of the pierced container, is pressurized slightly higher than the ambient air for the purpose of preventing entry of dust and dirt or germs from outside.

Next, an inspection head 2 descends from the upside of the container 1 into tight contact with container outer-peripheries 1b around the hole 1a at the upper portion of the container, and thereby to form a sealed pressure chamber 3 communicating with the hole 1a between the container 1 and the inspection head 2. The portion of the inspection head 2 contacting with the container outer-peripheries 1b is made of silicon resin acting as a sealing member. The pressure chamber 3 defined within the inspection head 2 conducts to the pressure sensor 4 through a conduit 8. Detection signals from the pressure sensor 4 are inputted to a display/determination device 10. That is, the pressure chamber 3 is formed communicating with the hole 1a by the member 2 (inspection head 2) in tight contact with the container outer-peripheries 1b around the hole 1a, thereby to detect the pressure within the pressure chamber 3 as a jet pressure of the gas A. A filter 5 is provided in an intermediate position of the conduit 8 in order to keep the container 1 in an aseptic condition. The display/determination device 10 includes a display screen 10a for displaying the pressure detection signals, and various control buttons 10b.

The container 1 is pressed at side walls 1c thereof by a pair of chucks 6, for the pressure sensor 4 to detect the jet pressure of the air A contained in the upper portion of the container and blowing out through the hole 1a. More particularly, the container 1 is pressed with the medical fluid L being present within the container 1. The performance of the pressure measurement may desirably be selected up to 2000 times/second. The results of the measurement are displayed on the display/determination device 10. The conditions set are such that the width pressed by the chucks 6 is approximately 10 mm when the container 1 is approximately 20 mm in diameter, and the pressure to be applied is 0.5 Mpa. The pressing force against the container 1 is removed when the measurement is completed.

It should be noted that, in actual situation, a reference pressure of the pressure sensor 4 (one example of the pressure detecting device for detecting the jet pressure) is reset every time the jet pressure is measured, in order to carry out a more accurate detection of the jet pressure. More particularly, the reset is performed after the pressure chamber 3 is formed by the inspection head 2 and before the pressing operation is effected by the pair of chucks 6. Thus, even if atmospheric pressure around the inspection unit tends to vary under the influence of a device for pressurizing the above-noted area to a slightly greater extent than the ambient air, for example, the jet pressure can be accurately measured free from the influences of such variations in atmospheric pressure.

FIG. 2 shows results of jetting experiments carried out on a large diameter-test hole 1a corresponding to a permissible maximum size of the hole and a small diameter-test hole 1a corresponding to a permissible minimum size of the hole. As understood from the graph, a pressure detection signal BP of the large diameter-test hole 1a describes a wave pattern indicating that, after the gas starts to blow out, the pressure value increases sharply to reach a peak, and then lowers gently. On the other hand, in the case of a pressure detection signal SP of the small diameter-test hole 1a, the pressure value gently rises after the gas starts to blow out to become eventually higher than the pressure value of the large diameter-test hole 1a.

Then, the detected value of the jet pressure is compared with an upper limit pressure value UL corresponding to the maximum size of the hole 1a and a lower limit pressure value LL corresponding to the minimum size of the hole 1a in a predefined period while the jet pressure is rising (specifically between 7 ms and 20 ms after the gas starts to blow out), thereby to determine the size of the hole 1a.

More particularly, a pressure value smaller by a predetermined value than the pressure detection signal BP of the large diameter-test hole 1a is defined as the upper limit pressure value UL, and a pressure value larger by a predetermined value than the pressure detected value SP of the small diameter-test hole 1a is defined as the lower limit pressure value LL. The hole size is determined appropriate only when the pressure value of the gas blown out through the hole 1a under inspection stands between the upper limit pressure value UL and the lower limit pressure value LL through the predefined period (between 7 ms and 20 ms after the gas starts to blow out) as seen from a curve "a" in FIG. 2. On the other hand, the hole size is determined inappropriate when the pressure value of the gas blown out through the hole 1a under inspection deviates from the range between the upper limit pressure value UL and the lower limit pressure value LL even in a part of the said predefined period. For example, the pressure value falls below the lower limit pressure value LL at the beginning of the said predefined period in the case of a curve "b" in FIG. 2, and the pressure value exceeds the upper limit pressure value UL at the end of the said predefined period in the case of a curve "c" in FIG. 2. In these cases, the hole is determined to have an inappropriate size.

Incidentally, the above inspection unit is provided in part of an assembly line where a number of molded flexible containers 1 are successively conveyed to undergo some processes thereby producing eye droppers made of resin and containing the medical fluid L. More particularly, the inspection unit may be provided in an inspection line located downstream of a line where each container 1 is pierced to have the outwardly opened hole 1a and filled with the medical fluid L. For example, the inspection line is provided with a round turntable having numerous containers 1 (specifically twelve containers, for example) placed thereon at a time and rotating at a constant speed. Twelve inspection units may be provided above the turntable to make a circular movement in timed relationship with the turntable so as to determine consecutively whether or not the size of each of the twelve containers 1 placed on the turntable is appropriate.

Other Embodiments

In the foregoing embodiment, the predefined period for determining the size of the hole 1a is set between 7 ms and 20 ms after the gas starts to blow out. However, a different period may be set as appropriate.

Further, the predefined period for determining the size of the hole 1a need not be a certain period of time, but may be set to a certain point of time (an instant) after the gas starts to blow out. Then, it may be determined whether or not the pressure value of the jet gas falls between the upper limit pressure value UL and the lower limit value LL at that point of time after the gas starts to blow out.

In the foregoing embodiment, the pressure within the pressure chamber 3 formed by the member 2 in tight contact with the container outer-peripheries 1b around the hole 1a is detected as the jet pressure of the gas blown out through the hole 1a. Instead of forming the pressure chamber 3, the pressure of the gas blown out through the hole 1a may be directly detected by setting a detecting plane of the pressure sensor 4 close to the hole 1a.

In the foregoing embodiment, the hole inspection system for the pierced container according to the present invention is applied to the inspection of the instillation hole of the eye dropper. The system is applicable to hole inspections of various other pierced containers.

INDUSTRIAL UTILITY

A hole inspection system for a pierced container according to the present invention may be applied to an assembly line of flexible containers having an outwardly opened hole, such as eyedroppers made of resin with an instillation hole formed therein.

DESCRIPTION OF THE REFERENCE SIGNS

Figure 1:
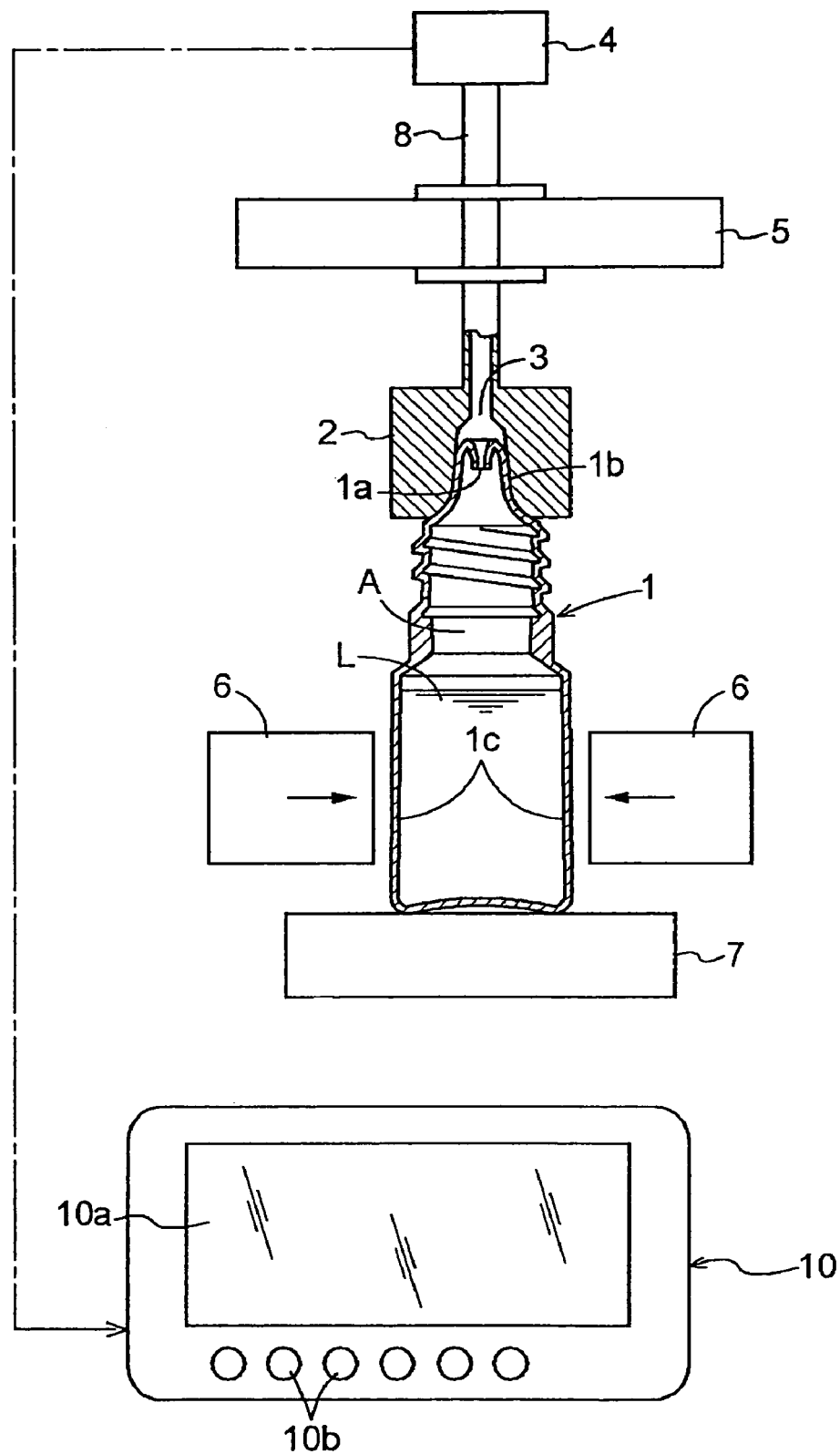
[FIG. 1] Schematic view of an inspection unit used in a hole inspection system according to the present invention.
Figure 2:
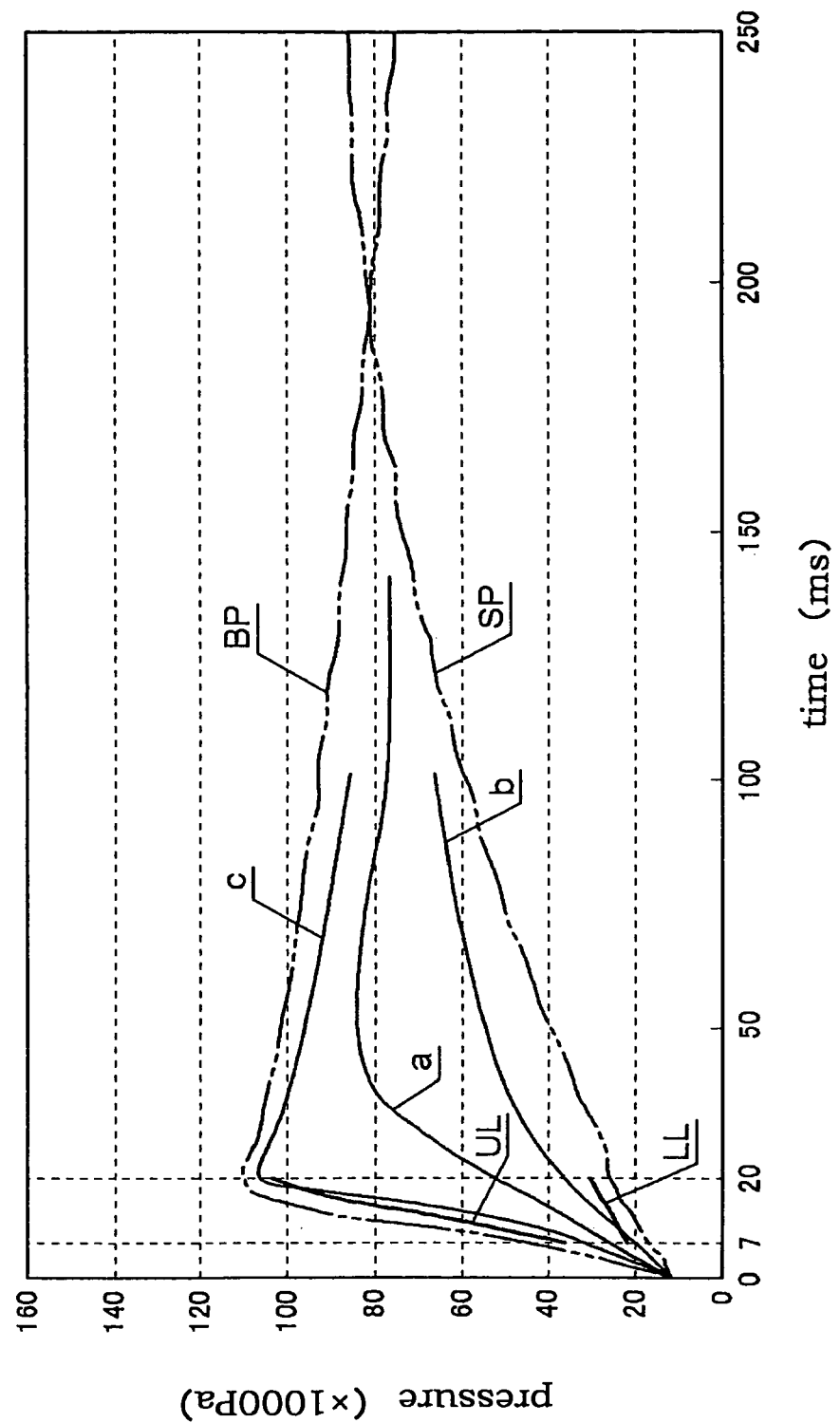
[FIG. 2] Waveform graphic representation showing pressure detection signals of a jet gas.

| | |
|---|---|
| 1 | container |
| 1a | hole |
| 1b | outer peripheries |
| 2 | member |
| 3 | pressure chamber |
| A | gas (air) |
| L | medial fluid |

The invention claimed is:

1. A hole inspection system for a pierced container for inspecting an outwardly opened hole formed in a flexible container, comprising:
    a pressing mechanism for pressing the flexible container from outside to cause the container to blow out a gas present therewithin through said hole;
    a detecting mechanism for detecting a jet pressure of the gas blown out through the hole by said pressing mechanism, and
    a determining mechanism for determining a size of said hole by comparing a detected value of the jet pressure in a predefined period with an upper limit pressure value corresponding to a maximum size of the hole and a lower limit pressure value corresponding to a minimum size of the hole.

2. A hole inspection system for the pierced container as claimed in claim 1, wherein said pressing mechanism includes a pair of chucks for pressing the container from outside.

3. A hole inspection system for the pierced container as claimed in claim 1, wherein there is provided a member for forming a pressure chamber by making tight contact with container outer peripheries around the hole communicating with the hole, and said detecting mechanism detects a pressure within the pressure chamber as the jet pressure of the gas.

4. A hole inspection system for the pierced container as claimed in claim 1, wherein the pressing operation is executed with a medical fluid being present within the container.

5. A hole inspection system for the pierced container as claimed in claim 1, wherein there is provided a resetting mechanism for restarting a reference pressure of a pressure detecting means for detecting the jet pressure before the pressing mechanism presses the flexible container from the outside.

6. A hole inspection system for the pierced container as claimed in claim 1, further comprising a support table supporting the container,
wherein said pressing mechanism includes a pair of chucks moveable toward one another over the support table to press outer surface portions of the container.

7. A hole inspection system for the pierced container as claimed in claim 6, wherein the detecting mechanism further comprises a pressure detecting means and a member moveable toward the support table, wherein with the container on the support table, the member makes tight contact with container outer peripheries around the hole to form a pressure chamber communicating with the hole, and said detecting mechanism detects a pressure within the pressure chamber as the pair of chucks engage the outer surface portions of the container to blow a jet pressure of the gas out through the hole.

8. A hole inspection system for the pierced container as claimed in claim 7, further comprising a resetting mechanism to restart a reference pressure of the pressure detecting means, wherein the pressure detecting means is reset before the chucks press outer surface portions of the flexible container.

9. A hole inspection system for the pierced container as claimed in claim 8, wherein a medical fluid is present within the container.

* * * * *